(12) United States Patent
Illingworth et al.

(10) Patent No.: US 6,729,839 B1
(45) Date of Patent: May 4, 2004

(54) TOROIDAL AND COMPOUND VORTEX ATTRACTOR

(75) Inventors: Lewis Illingworth, Kensington, NH (US); David Reinfeld, Englewood, NJ (US)

(73) Assignee: Vortex Holding Company, Avenel, NJ (US)

( * ) Notice: Subject to any disclaimer, the term of this patent is extended or adjusted under 35 U.S.C. 154(b) by 210 days.

(21) Appl. No.: 09/829,416

(22) Filed: Apr. 9, 2001

Related U.S. Application Data

(63) Continuation-in-part of application No. 09/728,602, filed on Dec. 1, 2000, which is a continuation-in-part of application No. 09/316,318, filed on May 21, 1999.

(51) Int. Cl.[7] .............................................. F04D 19/00
(52) U.S. Cl. ......................... 415/1; 415/58.5; 415/58.6
(58) Field of Search .......................... 415/1, 52.1, 58.4, 415/58.5, 58.6, 58.7, 182.1, 191, 208.1, 208.2, 211.2, 220, 221, 224

(56) References Cited

U.S. PATENT DOCUMENTS

| | | | | | |
|---|---|---|---|---|---|
| 1,149,638 A | * | 8/1915 | Davidson | ................. | 415/208.3 |
| 1,950,924 A | * | 3/1934 | Johnston | ..................... | 210/808 |
| 2,133,078 A | * | 10/1938 | Carter | .......................... | 34/100 |
| 2,138,999 A | * | 12/1938 | Clark | ..................... | 244/12.3 X |
| 2,432,775 A | * | 12/1947 | Lennon | .................... | 244/17.25 |
| 3,488,038 A | * | 1/1970 | Staaf | .......................... | 416/188 |
| 3,877,206 A | * | 4/1975 | Cody et al. | .................. | 56/12.8 |
| 3,934,844 A | * | 1/1976 | Reighart, II | ................ | 244/199 |
| 4,202,518 A | * | 5/1980 | Burnham et al. | .......... | 244/12.1 |
| 4,570,287 A | * | 2/1986 | Kerschner et al. | ............ | 15/346 |

* cited by examiner

*Primary Examiner*—Edward K. Look
*Assistant Examiner*—Richard A. Edgar
(74) *Attorney, Agent, or Firm*—Ward & Olivo

(57) ABSTRACT

Disclosed is an improved vortex attractor that utilizes a toroidal vortex within the attractor housing in order to establish a pressure differential between outside the device and inside. Furthermore, means to generate a cylindrical vortex to supplement the toroidal vortex are disclosed to increase attractor efficiency. The system of the present invention has the ability of achieving greater pressure drops than systems previously disclosed. Furthermore, it is easily fashioned into a flexible unit that can adapt to traversing curved surfaces.

42 Claims, 6 Drawing Sheets

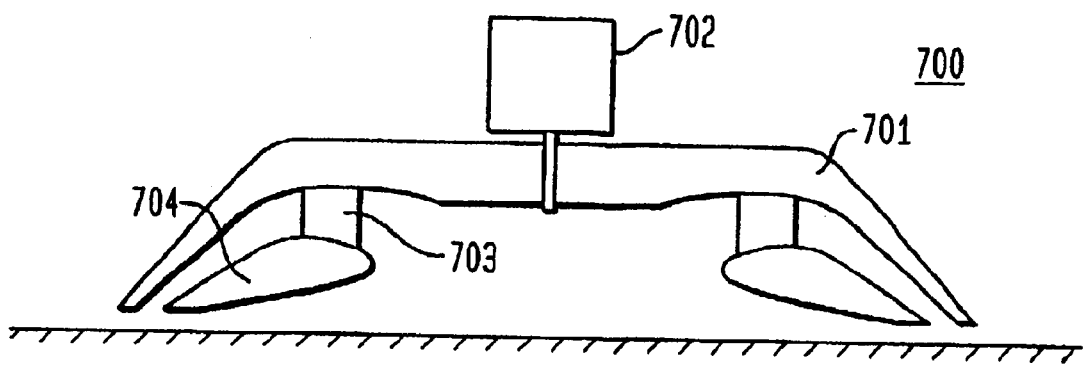
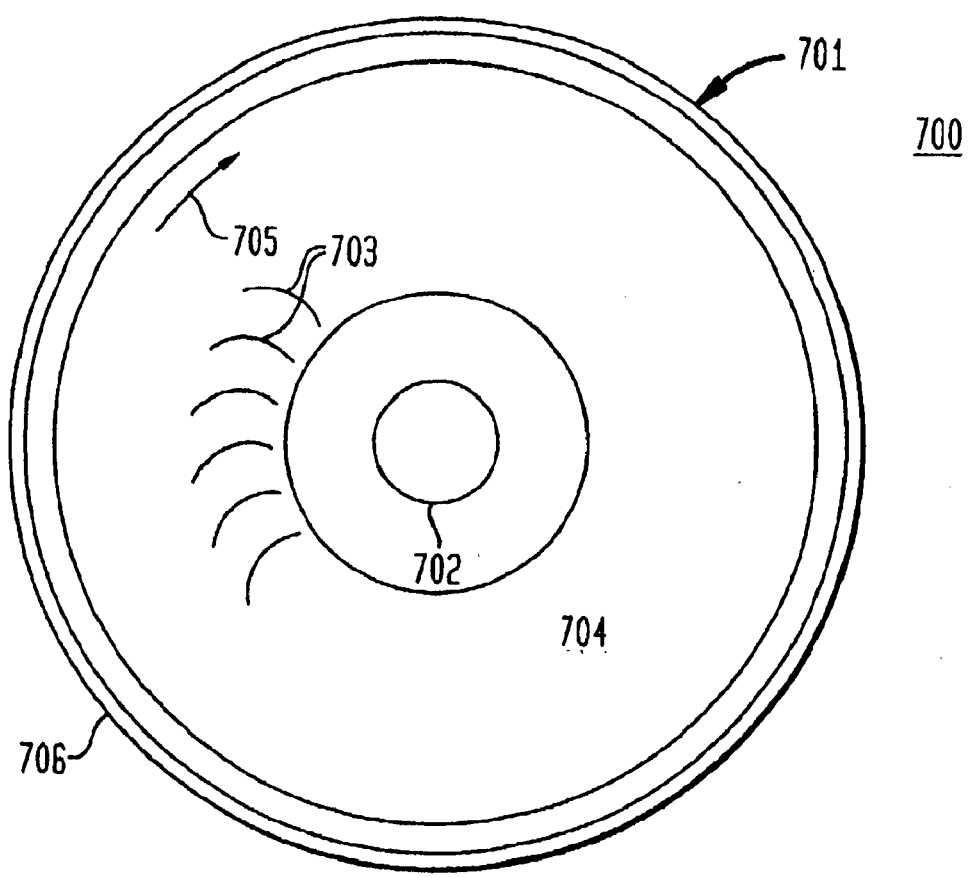

TOROIDAL AND COMPOUND VORTEX ATTRACTOR

CROSS REFERENCE TO OTHER APPLICATIONS

This application is filed as a continuation-in-part of copending application Ser. No. 09/728,602, filed Dec. 1, 2000, entitled "Lifting Platform", which is a continuation-in-part of co-pending Ser. No. 09/316,318, filed May 21, 1999, entitled "Vortex Attractor."

TECHNICAL FIELD OF THE INVENTION

The present invention relates initially, and thus generally, to lifting and suction generating apparatus. More specifically, the present invention relates to apparatus utilizing a partial toroidal vortex to establish a lifting force, and can further be configured to utilize a complete toroidal vortex to provide a suction force. Furthermore, the device can be configured in such a way as to further employ a cylindrical vortex to generate an even greater attractive force.

BACKGROUND OF THE INVENTION

The use of vortex forces is known in various arts, including the separation of matter from liquid and gas effluent flow streams, the removal of contaminated air from a region and the propulsion of objects. However, toroidal and cylindrical vortex forces have not previously been provided in a device capable of attracting itself to and/or removably attract other solid objects.

A tornado is a strongly rotating column of air, or vortex, generally attached to the base of a thunderstorm cloud and extending to a tip. The pressure in the center of the rotating column is lower than ambient and becomes lower still as the tip of the column approaches and attaches the ground or a solid surface such as a roof. If the vortex or vortices are not connected to the base of a cloud, they are not tornadoes, but rather are termed "gustnadoes".

Many devices and methods are used to attract solid objects or particles. A common method is with the use of suction generated by a vacuum. However, the vortex attraction forces created by the present invention is distinguished from a typical vacuum impeller system. Briefly, a motor driven impeller causes a circular fluid motion within its vanes, whereby the centrifugal force or centripetal acceleration throws fluid out through an exhaust. Pressure is reduced and fluid is drawn into the inlet and through the impeller blades to the exhaust. In contrast, the continuous flow through the impeller of the present invention is not exhausted, but rather, its energy is retained. Thus, the efficiency is greatly improved over a conventional vacuum impeller. However, extensive analysis has found that greater efficiency can be attained over prior vortex attractors taught by the inventor. Such attractors utilized a cylindrical vortex, herein described as tornado-like, but also created toroidal vortices that were considered parasitic. Herein, the inventor proposes attractor designs that take advantage of toroidal vortices, and make them contributory to the overall attractive effect.

Other methods of attracting or displacing solid objects or particles (on both large and small operational scales) include cranes, forklifts, springs, slide assemblies, hydraulics or electromagnets. However, the vortex generating apparatus of the present invention provides an efficient and versatile substitute for existing lifting or displacement methods and devices. For example, unlike electromagnets, the present invention is not limited to displacing or attracting objects having magnetic properties. Additionally, unlike traditional forklifts and cranes, pallets, straps or chains are not required to lift objects as the device presented herein may be configured to attract a surface of an object. Other benefits will become apparent from the summary and descriptions set forth herein.

Furthermore, devices using the invention herein may be configured to attract itself to a solid surface. Prior methods of removably adhering devices to solid objects include magnets and suction cups. The present invention may replace these prior methods in applications where control, movement and predictability are added concerns.

Heretofore unknown, proposed herein is a device utilizing a variety of vortex principles to optimize the attractive force. These attraction forces are generated by a vortex apparatus that may be used for attracting and removably adhering solid objects or for removably adhering itself to a surface. The prior art is desolate of an apparatus utilizing the vortex phenomena to accomplish the objects relayed herein.

SURVEY OF THE PRIOR DISCLOSURES

The prior art is strikingly devoid of references dealing with toroidal vortices. However, the following represent the references that the inventor believes to be the most relevant. One skilled in the art will plainly see that even these do not approach the scope of the present invention.

Heron, et al United States Patent Number ("U.S. Pat. No.") 4,836,498 discloses a liquid flow control assembly for use in hydraulic systems. The invention utilizes a frusto-conical guide surface within a guide member to direct a fluid flow into a toroidal vortex flow pattern. This flow pattern is beneficial in this instance because it controls the collapse of bubbles within the fluid, which occur as a result of cavitation. Cavitation can erode subjected components, and is also a source of noise and vibration. Clearly, Heron, et al do not approach the scope of the present invention. Nowhere do Heron, et al discuss the use of a toroidal vortex as a means to generate an attractive force. Importantly, the pressure characteristics of a toroidal vortex not even appear to be recognized.

Fuimefreddo, et al U.S. Pat. No. 5,013,883 discloses a plasma spray device. The spray device has a ring member at its exit with a plurality of equally spaced holes directed radially inward. Air is injected into the holes, and forms a toroidal vortex surrounding the nozzle. The toroidal vortex is utilized to prevent the deposition of powder onto the nozzle during operation. Fuimefreddo, et al do not teach the use of a toroidal vortex to generate an attractive force, nor is the behavior of the vortex studied in any great detail.

Newton, et al U.S. Pat. No. 5,165,226 relates to a combustion chamber for a gas turbine engine. Within the chamber, annular liners with louvers induce a toroidal vortex flow. The toroidal vortex flow is said to ensure a more complete combustion of the reactants. However, the use of toroidal vortices to generate an attractive force is not mentioned or suggested.

SUMMARY OF THE INVENTION

The present invention is directed to an efficient apparatus capable of generating a negative pressure region that produces attractive forces in the form of a vortex flow (also referred to herein as a "vortex attractor"). The vortex attractor may be used alone or in conjunction with other mechanical or electronic systems. The present invention has the functional ability to pull, suck, suspend, hold, lift and interrupt. The negative pressure regions also can adhere a vortex attractor to a surface. For example, an apparatus is provided that is capable of pulling itself toward a surface or maintaining itself a certain distance relative to a surface. Furthermore, the fluids that may be acted on by the present invention include any gas (e.g., air), liquid (e.g., water), any combination thereof, slurries, or any gas and/or liquid having solids and/or particulates dispersed therethrough.

These general uses and additional examples described herein are accomplished by providing an apparatus comprising one or more impellers or vanes, and a shell. The impeller or impellers are positioned within a shell that has one closed end, or impeller end. Materials of construction for a vortex attractor will vary depending on the desired application.

The shell comprises a containing ring or wall and a backplate for said wall. The containing ring or wall may be attached to the impeller vanes and rotate with them or may be separate from the vanes (relatively close to the vane ends) and may be mounted on a stationary frame. The backplate may be connected with the impeller vanes and rotate with them or may be separate from the vanes (relatively close to the vanes), and may be mounted to a stationary frame. The containing ring and/or backplate may be sealed such that fluid cannot flow radially through the vanes or backwards behind them, or they may have apertures or vents in them to allow for some fluid to circulate radially and behind. These apertures or vents preferably are configured such that sufficient surface area remains upon the containing ring and/or backplate to act upon the fluid and induce a vortex flow. Furthermore, the apertures or vents may be controllable in order to rapidly reduce attraction. The fluid flow through the vents may be used to power auxiliary functions or for measurement control. Also, to control the type of vortex flow generated, i.e., cylindrical or toroidal, internal flow guides are utilized. These can consist of a member aligned within the shell of the vortex attractor, concentric to the outer shroud or containing ring.

The impellers rotate about an axis within the containing ring. The axis typically corresponds with a driveshaft which passes through the backplate. Generally, the impellers rotate about a central axis of the containing ring or wall. However, this axis may be positioned other than centrally depending on the impeller configuration, the shape of the containing wall and the particular application. The impellers or vanes may be incorporated in the containing walls, or may be separately rotatable. The vanes may be flat, curved or pitched and various configurations are possible, as further described herein.

The device may optionally include a safety screen or ring, or may have a shield mounted on the vanes in a manner that does not obstruct fluid flow in directions necessary for correct operation of the vortex attractor. Such shields are for safety purposes or to prevent the possibility of obstructions within the vanes.

When the backplate is not connected to the impeller blades an aperture is provided for the driveshaft to pass through said backplate. If a completely sealed backplate is required, the driveshaft may pass through a sealed and lubricated gasket or bearing assembly. The backplate, whether connected to the impeller blades, or separate from them, may also contain one or more additional apertures or slits. These additional apertures or slits may be provided to minimize weight, for decorative purposes or to provide any desired functionality related to a specific configuration or application. These additional apertures or slits may be provided in order to generate external fluid flow for auxiliary functions or monitoring.

The driveshaft may be powered by any conceivable means, such as AC or DC electric motors, gas or fuel combustion motors, steam power, compressed gas or air, flywheel or other mechanical stored energy device. The driveshaft may be of any length or shape, and it may be flexible, allowing for optimum positioning and maneuverability of the vortex attractor. Power may be provided directly from the motor to the driveshaft, or by one or more drive belts or chains connecting the driveshaft to the motor. Optional gears may be provided which allow the driveshaft to reverse the direction of rotation or allow for the speed of the impeller to be controlled at a constant motor speed. Alternative drive mechanisms may also be used, such as water, wind or magnetic arrangements. Furthermore, the power source may also provide energy to additional devices fixed to the vortex attractor.

The forces of the vortex attractor are generated by the spinning impeller or impellers which act upon fluid entering from the open end of the vortex attractor. In a pure toroidal vortex attractor, a fan is encompassed within an outer shroud that is open towards the surface. An inner shroud is provided that is aligned below and concentric to the fan blades. The inner shroud can be made rather chick, somewhat resembling a donut shape. Air is blown down through the fan blades, but because the top of the system is seal, the air pressure in the center is reduced. Air moving downwards at the bottom of the inner shroud and the outer shroud is drawn inwards. When equilibrium is established, the difference in pressure between the inside of the system and the ambient outside becomes a function of air density, a second order function of air velocity, and an inverse function of the radius of curvature, of the air as it turns from vertical to horizontal underneath the center of the system. A fluidic seal is generated by the inertia of inward turning air. The direction of the spin does not matter, as the only change would be the direction of the fluid flow and the same attractive forces are generated as described herein.

Furthermore, a compound vortex attractor is disclosed that utilizes both a toroidal and cylindrical vortex flow. A vortex attractor can generate a greater overall attraction by spinning the fluid (e.g., air) in the manner of a cylindrical vortex attractor, while retaining the beneficial toroidal vortex function. Such an arrangement generally has fewer parts and is somewhat simpler than a standard toroidal vortex attractor. Basically, an impeller is encased by an outer shroud having tapered walls. An inner shroud, preferably shaped like donut that has an airfoil-like cross section, whose chord line is parallel to the tapered walls of the outer shroud is placed concentric to impeller blades. The leading edge of the airfoil cross-section is adjacent to the tips of the impeller blades. A toroidal component is generated by the fluid that flows around the inner shroud. A cylindrical component of flow is generated that circulates parallel to the attracted surface. The speed of the cylindrical flow is approximately that imparted by the impeller tip speed.

A desirable feature of vortex attractor is that the flow through the system is limited, as there is not a separate fluid intake and exhaust. The fluid circulating through the vanes of the impeller originates from the region about the impeller axis and within the confines of an imaginary frustum, cylinder or torus extending away from the impeller end of the shell rather than from a separate inlet. This eliminates the inefficiencies created by methods of the prior art because the system need not continuously cause a fluid flow from an intake through an exhaust.

A protective screen, plate or specific shell geometry may be applicable to position a shield in front of the impeller blades to minimize injury and to prevent objects from striking the impeller. The screen may comprise concentric circles or a spiral screen. Other arrangements include covering the region above the impeller blade path with a separate ring plate or with certain shell geometry. For example, the containing wall may be fabricated having a portion that extends toward the impeller axis to protect the vanes. Preferably, such a plate or extended portion allows fluid to flow through the region about the axis of the impeller, and allows fluid to exit through the region near the containing ring walls.

The invention described herein generates a low pressure area that extends from the impeller end to the object or objects to be attracted (or object being attracted to). The low pressure region between the impellers and the object is maintained by the impeller motion. The vortex attraction forces increase as the object moves closer to the containing ring, as there is less resistance from ambient fluid.

One particularly useful feature of the vortex apparatus is that the distance from the impeller blades to the surface has an approximate linear relationship with the impeller operating power requirement and the attractive forces generated. The vortex power increases linearly as distance increases, and the vortex lift decreases linearly as distance increases. This linearity (over part of the range of distances from the impeller blade) provides predictability and efficiency in applications where the vortex apparatus of the present invention is maintained a certain distance from a stationary or non-stationary surface. Objects may be suspended a distance from the vortex attractor (rather than be removably adhered), or alternatively, the vortex attractor may be suspended a distance from a stationary surface. For optimal suspension, a responsive control system is provided which senses any change which may effect the required impeller speed and accordingly adjust the speed. Moreover, the linearity proves useful for control mechanisms, motion sensors, measurement devices or speed detectors. Outside fluid effects, such as wind, turbulence or deterioration of the fluid flow from movement of the vortex device, should be taken into consideration when fluid is between the impeller and the surface (note that this is not a major factor when the object is removably adhered to the vortex attractor, as little or no additional fluid flows from the ambient surrounding acts upon the system).

Furthermore, the pressure differential (and hence the attractive forces) may be varied for certain applications (i.e., maintain separate distances between the impeller end and the surface) by changing the speed of the impellers. The impeller speed can be changed by varying the power input or with a gear transmission system. Additionally, a gear transmission may also relate power from the impeller power source to auxiliary devices.

The principles of the vortex flow and reduced pressure are applicable in multiple applications, on scales ranging from microscopic to very large. The vortex attractor may be used alone, in combination with wheel or tracks, on a conveyor belt, etc. Various devices may be attached to the vortex attractor for sensing, measuring, recording, etc. A warning system may be provided for vortex attractors operating on a limited power source, such as a battery, to prevent the attractor from failing while in use. Furthermore, the vortex attractor may be controlled manually, remotely by computer, conventional remote control or via on-board software. The controlled elements of the vortex attractor may include impeller speed, by variations in power input and/or by gear changes, impeller blade distance from the impeller end of the containing ring or outer shield or power source variations.

Therefore, according to the present invention, an efficient device is provided that uses the low pressure zone created by one or a plurality of vortex fluid flow phenomena to attract objects or attract itself to a surface. This device may be employed for numerous purposes, such as industrial transport, underwater lifting, electromagnet applications, switches, sensors, detectors, toys and other applications where objects or tools are displaced and/or maintained in a suspended or removably adhered position.

Lifting Devices

In the field of industrial transport, a vortex attractor may be used in place of or in addition to a crane or other hoisting machinery. It can be used to lift, maintain, and move objects across a factory or warehouse. This type of vortex attractor may be particularly useful in lifting, maintaining and/or moving delicate objects such as glass panes. Additionally, unlike a magnet or electromagnetic crane, magnetic properties of the attracted object are not relevant.

An assembly including one or more vortex attractors may be suspended from a ceiling track system or other suspended transport system capable of traversing about an area. For example, an extendable and retractable cable may be suspended from a ceiling track system within a plant that travels in the x axis and y axis. A vortex attractor having the impeller end facing the ground is provided at the opposite end of the cable. When the attractor is positioned no more than some maximum distance (based on the weight of the object, the size of the attractor and the impeller speed) over the object to be moved, the impellers are activated. This causes the object to rise, preferably contacting the impeller end either the containing ring or the outer shield. The track system may then be activated to traverse the plant and the cables may be extended and retracted as needed. Alternatively, the objects may be suspended a distance from the vortex attractor. In situations where a suspended object is moved, the effects of the changed fluid flow must be considered in maintaining the proper impeller speed. Note that this is not a factor when the object is removably adhered to the vortex attractor, as no additional fluid flow acts upon the system. When moving a load attached to the vortex attractor, there are no adverse effects on the low pressure generated (assuming the minimum impeller speed for that load is maintained). In an alternate arrangement vortex attractors may be used in place of the overhead track system to traverse the ceiling while suspended vortex attractors perform the above mentioned lifting functions.

Vortex attractors are also applicable as substitutes for forklifts or on flatbed trucks with winch or overhead forklifts attached for loading and unloading. This may be similar to the suspended systems described above, using a boom in place of or in conjunction with a tracking system. However, other arrangements are contemplated, including a rigid arm system, for instance, where the vortex attractor is attached to the extremity and the arm is capable of moving, extending and retracting. Often, the objects lifted by these various arrangements are fragile or easily subject to scratching or marring from conventional forklifts. A vortex attractor may perform the tasks of a forklift or suspended forklift capable of moving large delicate objects without breakage or scratching. This is accomplished, for example, by providing a non-marring surface on the impeller end of the containing ring or outer shield, providing a cushion between the vortex attractor and a delicate object.

Similarly, a vortex attractor is useful as a lifting device for physically challenged people. The forces required to displace access platforms and chair lifts in vehicles or homes may be provided by a suspended vortex attractor or a vortex attractor attached to a boom. Furthermore, a lifting device may be created which comprises a vortex attractor attached to a flexible or non-flexible pole to aid in lifting commonplace objects such as cups, boxes, etc.

The driveshaft of a vortex attractor may be flexible. Such a driveshaft configuration may be incorporated as a portion of a suspended attractor (at the attractor end of the cable), as a portion of or substitute for an attached arm, or on a hand-held device. This is useful, for example, on an assembly line, where the vortex attractor can maintain an object in a desired position while is mounted in place. Another use of a vortex attractor having a flexible driveshaft is as a tool for holding or retrieving an object or workpiece in a tight area. For example, a mechanical snake having an attractor on one end may be directed through a wall or ceiling. Optimally, sensors and remote control capability are included for enhanced accuracy.

Furthermore, if a screen or protective ring is placed in front of the impeller end, the vortex attractor may be used to lift piles of objects which would otherwise lodge within the impeller assembly. The objects would instead adhere to a screen, preferably constructed of concentric rings, and may be removed from the vortex attractor by reducing impeller velocity. For example, loose objects may be adhered to the screen until the flow is sufficiently obstructed to prevent attractive forces.

Also, various waste can be collected using a vortex attractor shell comprising an inner shield and an outer shield. The impellers in such an arrangement are preferably protected by a ring or plate, and the center of the impeller assembly remains open. Waste is collected by the vortex flow and travels through the impellers and may be discharged into a separate collecting bin. Alternatively, the inner shield may serve to both guide the flow (about the outside wall of the inner shield) and collect the debris.

Objects can also be lifted underwater using a vortex attractor. A vortex attractor will provide a low pressure region near a surface of an object and adhere itself to the surface. This is very useful for removing objects underwater or within other fluids without disturbing the ground under the object, thereby preserving the underlying terrain.

Toys and Amusement

In addition to industrial and commercial uses, the vortex attractor of the present invention can be the core of various toys. As safety is a major concern with children, a safety plate, ring or-screen of concentric members may be mounted on the face of the impeller end. A lifting toy can be created, which is capable of lifting and holding an object. The forklift and crane replacements described above may be recreated on a smaller scale for various toys and models. A vortex attractor may be provided at an end of a rigid or flexible arm or handle to create a toy in the form of a hollow tube or wand, which, when the impellers are caused to spin, creates a low pressure area capable of attracting and holding objects. The hollow tube may also be flexible, with the vortex attractor at one end driven by a flexible driveshaft. This type of lifting toy may be incorporated in various games including games of skill, or to improve hand-eye coordination and response time. A variation of a lifting toy may be also included with building block and mechanical model sets, including sets using interlocking blocks and/or separate fasteners.

This lifting arm or handle can also be incorporated on toys such as dolls or action figures so that the toy is capable of holding an object without having predetermined grooves or openings. A toy may be created which can throw an object by providing arm motion coupled with timed vortex release of an attracted object. Additionally, vortex attractors may be provided at the feet, hands, knees or posterior of dolls or action figures, allowing it to stand, sit or kneel in any position, and more complex toys and models may be created which can crawl, walk, run or sit. With sufficient draw force provided by the vortex attractors, the toy may be capable of walking or crawling across a floor, up an incline or vertical wall, and across a ceiling.

Various positions of vortex attractors will increase the crawling or climbing capabilities. For example, a slithering toy resembling as snakes or worms may be created using multiple vortex attractors. Essentially, several attractors are placed within a flexible tube at various positions and facing various directions. The attractors may be controlled in a pattern or randomly by on-board software or manually be remote control. The toy can slither across a floor, climb walls and scale ceilings. Additionally, various types of insects, arachnids, reptiles, dinosaurs, mammals or fictional creatures may be created having vortex attractors at the extremities and tails of the respective creature. Controls, on-board or remote, allow the creature to move by activating, reversing and deactivating certain attractors. Optionally, vortex attractors on other positions, for example the backside or underside to allow the creature to lay flat, roll over, etc. Any of the action figures, creatures, etc. described may be made on a larger, even life size, scale using the attractor positioning and activation to simulate movement. These are useful for various entertainment purposes such as movies and other displays, but in certain applications may also prove to be efficient devices to transport various tools and materials.

A toy car, truck, boat, train, etc. may also be created with a vortex attractor. One type of toy car comprises wheels and one or more vortex attractors having impeller ends substantially perpendicular to the plane of the wheelbase. The wheels may also be powered by conventional means. The toy car will "propel" if the vortex attractor is placed toward a wall or other solid object. Vortex actuation, power, steering, or other functions may be controlled remotely or with on-board software. When the vortex attractor is actuated, the toy car will move toward a wall or object opposite the impeller end because of the low pressure region created between that surface and the toy car. By activating an additional attractor on the toy, for example on the opposite end, the toy will "propel" toward another wall or object. Several of such toys can be combined with a toy bumper car rink, where bumper cars are simulated with the additional feature of attracting toy cars to each other and maintaining the captive state.

Another type of toy car, truck, boat, train, etc. may include a vortex attractor having an impeller end facing the plane of the wheelbase. The wheels (or rollers, tracks, casters or ball bearings) may share the power source of the impeller or may operate from a different power source. If certain types of casters or ball bearings are provided, the toy car may traverse omnidirectionally over a surface, rather than separately in the x-axis direction and in the y-axis direction. The vortex attractor placed essentially on the underside of the toy car allows it to climb up a wall and across a ceiling when the attractive forces are actuated. This type of device, also referred to as "climbing attractors", are described further in relation to other applications.

Any of the toys and entertainment devices described may be used alone or in conjunction with a board game, story, book, or computer or video game. For example, for use with a computer game or story, the power input may be measured and other sensors included on the toy with appropriate peripheral hardware and software to relay the information about the toy's position to the game or story. Also, various mazes and labyrinths may be created by using the principles of the bumper cars, described supra, with multiple vortex attractors on a multi-sided shape (movement similar to creatures) or with various climbing attractors described supra.

A vortex attractor may also be used to suspend an object from a ceiling or wall. For example, an attractor may be provided that adheres to a ceiling and includes a cord or flexible attached to an object. The object may be of any variety, such as toy airplanes, helicopters, rocket ships, flying saucers, lighted or Illuminated forms and still frame and video cameras. The cord may be controlled to spin the object, or a flexible gooseneck attachment may be provided.

On a larger scale, may of the above described toys may be created for props and simulated scenes in the movie and entertainment industry, museums, displays and other exhibits. For example, video cameras may include a vortex attractor attached directly thereon or attached at the opposite end of a cord, rod or gooseneck. It may be positioned anywhere in a set on a surface. Wheels or casters and various remote and/or computer controls are used to easily position the camera.

Props may also be hoisted, pulled, suspended or held by vortex attractors. For example, props or cameras may be suspended from a ceiling by a device comprising one or more vortex attractors facing the wheelbase of a caster assembly having a flexible gooseneck extending therefrom, and a second set of one or more vortex attractors attached to the opposite end (or, props or cameras may be affixed to the opposite end by other means). The caster end can track up a wall, across a ceiling and across a floor, moving the prop in any desired direction and holding it in any desired position. The same device may be reused for other props, and there is no need to construct an extensive tracking system, thereby increasing speed and efficiency. Further, vortex attractors may replace booms in various applications.

Components

Vortex attractors may also be used as a component of an electronic and/or mechanical device. For example, instruments containing circuit breakers, relays, and other switches using electromagnets, may be improved with the present invention. The role of electromagnets may be replaced without generation of a magnetic field with a vortex attractor. For example components used in conjunction with magnetic storage such as computers may be improved with the elimination of electromagnets. The absence of a magnetic field allows such a component to be located closer to magnetic storage media without fear of corruption.

Furthermore, the weight of circuit breakers, relays and other types of switches can be reduced by substituting vortex attractors for electromagnets. Magnetic metals are not necessary. Instead, one or more vortex attractors may be provided which may be fabricated of lighter material such as paper, cardboard, wood, plastic blends, rubber compounds, aluminum, etc.

Vortex forces are useful for operating switches. A vortex attractor mounted opposite a sliding gate can open the gate (by spinning the impellers causing vortex attraction) and close the gate (by stopping the attraction) Changing the speed of the impeller to gradually increase and release the attractive forces of the vortex can also variably control the gate. Moreover, as discussed infra and supra, the power input requirement and attractive force are in partial linearity with the distance from the impeller to a surface. Thus with variations in power input, precise distances of the switch may be achieved and maintained and the speed of the switch in action may be controlled.

The present invention may also be employed in various types of door and window mechanisms. A vortex attractor could be used to operate a lock or deadbolt. This would allow for simplified electronic control of a structurally locking device. For example, a proximity switch using the vortex attractor can operate an aircraft door. The electronic control operates to switch on and off the impeller, which draws the locking mechanism toward it. Also, a vortex attractor could be used to control a sliding door or window.

Removable Mounting Means

The attractive forces generated also may be used to removably adhere a vortex attractor having an object fixed thereon to a wall or ceiling. Security surveillance such as video, audio or motion sensors, including those described herein, is facilitated by use of the vortex attractor. Other sensors may be included for industrial surveillance, such as gas-detect, including specific chemicals (i.e.., radon, carbon monoxide, etc.), temperature, pressure, radiation, infrared, electromagnetic field, etc. These devices comprising a vortex attractor and a sensor may be removably adhered to any surface, and is particularly useful in relatively inaccessible locations such as high walls or ceilings. A vortex attractor may be used for surveillance in locations where atomic or other radiation precludes human access such as nuclear reactors or for furnace inspection while the furnace is hot.

Other devices may be attached to a vortex attractor for functional or decorative purposes. A vortex attractor may be used to temporarily mount something to a wall or ceiling. For example, paintings, sculptures, advertising displays, shelves, projectors, masks, etc. may be adhered to a wall or ceiling with a vortex attractor. A vortex attractor may, for example, have a Velcro™ patch, a cord or a hook affixed thereon to adhere a decoration. Wall marring, holes and tape residue can be minimized. It may also be used as a base for a vertical object such as a mannequin, coat rack, etc.

Climbing and Traversing Apparatus

Vortex attractors may include wheels, casters or tracks attached for numerous applications, including toys, inspection, surveillance, lifting, spraying or injecting, etc. The wheels, casters or tracks may be powered by the same source as the vortex attractor or a different source. Casters may be provided which rotate freely and omnidirectionally, and typically provide a well-known ball-bearing type construction that reduces the friction as the wheels rotate. These types of casters provide smooth movement and direction change, as opposed to separate movement in the directions of the x-axis and y-axis.

A traversing apparatus may also have the capability to traverse sharp angles, for example, from a wall to a ceiling. This can be achieved by increasing the power to the impeller, as the distance from the surface to the vanes increases as an angle is traversed, or with vortex attractors mounted in various positions on the climbing device. Multiple vortex attractors are employed generally having impeller ends facing multiple wheelbases. Any functional shape may be used, such as a sphere, cylinder, cone, cube, prism, pyramid, truncated pyramid, tetrahedron, parallelepiped or rectangular parallelepiped. Wheelbases are provided on any or all faces (or portions of arcuate surfaces, as in spheres, cones and cylinders).

This type of apparatus, a traversing vortex attractor, may be controlled remotely or by on-board software. Essentially, the climbing or traversing vortex attractor may traverse a wall or ceiling by activating both the wheels and the vortex attractor. The vortex forces adhere the apparatus to the wall or ceiling and the amount of attractive forces may be varied remotely or automatically via on-board software. A traversing vortex attractor is also useful underwater or submerged in other fluids.

A traversing vortex attractor may be used for both large and small applications. To illustrate, an industrial traversing vortex attractor may include a cargo area for transporting materials or equipment up walls. Such an industrial use is applicable in situations where overhead lifting means are prevented, or when a versatile pick and place machine is desired. Additionally, a traversing vortex attractor may be configured with an additional vortex attractor suspended via a cable or other suspension means that can lift objects (as described infra).

Another device incorporates one or more miniature sensors and/or tools. This apparatus is appropriate for various purposes, such as inspections of both the outside and inside of pipes, tanks and other apparatus, performing structural evaluations of concrete or masonry walls, detecting atmospheric conditions at various heights, or remote control security devices, for example. Tools provided may include pens, paint rollers, sprayers or brushes, cutting edges or tips or stampers for drawing, painting, etching or imprinting various patterns on a surface.

Optionally, a warning signal may indicate that energy reserves are low, whereupon a controller may act upon that signal to prevent the attractive forces from diminishing and the apparatus falling. Alternatively, on-board software may be programmed to sense the diminishing energy and act appropriately, such as reverse direction for energy replacement or shut down secondary loads.

Security surveillance devices such as video, audio or motion sensors, may be controlled with a traversing vortex attractor. Other sensors may be included for industrial surveillance, such as gas-detect, including specific chemicals (i.e., radon, carbon monoxide, etc.), temperature, pressure, radiation, infrared, electromagnetic field, etc. These devices comprising a traversing vortex attractor and a sensor may be removably adhered to any surface and may freely move about the surface via human remote control (assisted by cameras and/or sensors where required), remote computer control, or on-board computer control.

Various materials can be sprayed from a traversing (or stationary) vortex attractor. For example, a vortex attractor may include one or more sprayers, jets or nozzles. Such a device may be used, for example, to paint a wall or ceiling by placing the vortex attractor on the surface and activating a rotating sprayer, whereby paint can be spread. A paint (or other coloring solution, including various types of invisible ink) supply may be carried by the vortex attractor, or may be separately fed through a tube. Sensors may be added for particular applications. For example, a vortex attractor including wheels, a jet sprayer and a depth sensor may be used to locate and apply paint where existing paint is chipped.

In addition to spraying, materials can be injected from a vortex attractor. A traversing vortex attractor may be provided including an injection means. This may have particular application in new construction or maintenance. For example, a joint of a wall may be caulked with a vortex attractor comprising powered wheels, casters or tracks, an injection means and a caulk supply (either attached or fed via a tube). As with the sprayer embodiments, various sensors may also be incorporated. Such a device may be used to sense defects in a wall, as where an existing caulk or mortar joint is void, and accordingly inject the appropriate material therein.

Any of these devices incorporating a traversing vortex attractor may be modified to perform functions underwater. For example, a traversing vortex attractor incorporating various sensors can be submerged in a tank and may detect changes in the temperature, pressure, turbulence, etc. at various levels. Furthermore, a traversing vortex attractor may be used as a swimming pool cleaner and detritus collector. The low pressure region acts to both attract the apparatus to a solid surface such as a wall or floor of the pool and to dislodge dirt and other debris from the solid surface.

Sensors and Detectors

Vortex attractors may also be used as motion detectors. A spinning airflow could extend to an object suspended by the vortex forces. When the path of the spinning airflow is broken, i.e., by a foot or a tire, the suspended object would be released due to the increase in pressure. This loss of attraction of the suspended article could trip an alarm or trap, and may be automatically reset once the path of spinning airflow becomes unhindered.

The relationship between the power input and the distance between a surface and the impeller is extremely useful for sensors and detectors. For example, the distance of a surface or body may be determined by measuring the power input at that impeller position. Velocities, acceleration, drag, friction and turbulence may also be detected in a similar manner. Utilizing this relationship, vortex attractors may replace other measurement devices in weather meters such as barometers.

Another type of vortex attractor sensor can be used for windows, doors or glass panes. Essentially, for a window, a small vortex attractor driven by an electric motor is situated within a window frame, having the open face toward the bottom of the window. When the window is closed, very little power is required to maintain the impeller speed because there is no interference from ambient air. If a window is opened the air load on the impeller is increased and the motor slows down accordingly. The change in motor speed can be detected via sound, RF or other means. A sound, RF or other detector would indicate the variation and trigger an alarm system (i.e., sound an audio and visual alarm, emit a separate RF or other signal to a station, signal a telephone alarm service, etc.).

Miscellaneous Uses

The vortex attractor is not limited to the uses described herein. For example, in various types of vehicles, such as automobiles, trucks, trains, boats, ships, submarines (manned and unmanned), airplanes, helicopters, spacecrafts and satellites, vortex devices may be employed for many applications. As with the above-described uses, vortex attractors may be used for door locks, window locks, power windows or sliding doors. Vortex attractors may also be used with power mirrors. With power mirrors, a single vortex attractor could be mounted behind a mirror on a circular tracking device. The mirror would be mounted on a sturdy ball-joint attachment to allow full adjustment. Additionally, several vortex attractors could be mounted behind the mirror and the appropriate combination would adjust the mirror to the user's need. Adjustable seats may also be provided wherein the base of the chair houses a plurality of vortex attractors. For example, the seat may be mounted on one ball-joint attachment, and the one or more vortex attractors could be actuated to tilt the seat in any direction by pulling the chair toward the floor. This type of seat may be used in a home, automotive, nautical or aircraft.

Vortex attractors may also provide an active weight balancing system, which may also be used as a leveling system for any type of fixed installation, aircraft, ship or vehicle. For instance, in a tanker, vortex attractors may be placed at various positions to generate forces that may counter uneven weight distribution of the fluid in the tanker.

In a vehicle, vortex attractors may be placed at various positions on the underside to aid in balancing. This may be accomplished by a centrally located vortex attractor or multiple vortex attractors. In a system employing a single vortex attractor, when the vehicle is on a slope, the attractor is activated providing a stabilization force to aid the existing gravitational forces. In a system employing multiple attractors, appropriate attractors are separately activated to leveling the vehicle or preventing the vehicle from flipping over.

Another tool or device which may be created with one or more vortex attractors may be used as a hammer or cutting tool. Such a device comprises one or more vortex attractors and a hammer head or a cutting head. Said hammer head or cutting head is attracted to the impeller end of the vortex attractor upon activation, and is released upon deactivation. The action (hammering or cutting) may be from gravity or by other force-generating means. Such other force generating means may comprise existing art (such as means used in air chisels or electric compression chisels) or may be provided via mechanical linkage of the vortex attractor.

Thus, it is an object of the invention to provide an efficient apparatus for generating an attractive force.

Furthermore, it is an object of the present invention to generate an attractive force through the use of a toroidal vortex fluid flow.

It is an additional object of the invention to provide an apparatus that generates a substantial attractive force by utilizing a toroidal vortex fluid flow, supplemented with a cylindrical vortex fluid flow.

SUMMARY OF THE DRAWINGS

A further understanding of the present invention can be obtained by reference to a preferred embodiment set forth in the illustrations of the accompanying drawings. Although the illustrated embodiment His merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as,subsequently amended, but merely to clarify and exemplify the invention.

For a more complete understanding of the present invention, reference is now made to the following drawings in which:

FIG. 7A depicts a side view of a solid compound vortex attractor; and

FIG. 7B depicts a top view of a solid compound vortex attractor;

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in-that regard, they are deemed to afford the best embodiment for purposes of disclosure and to provide a basis for the claims herein which define the scope of the present invention. The following presents a detailed description of a preferred embodiment (as well as some alternative embodiments) of the present invention.

Certain terminology will be used in the following description for convenience in reference only and will not be limiting. The words "in" and "out" will refer to directions toward and away from, respectively, the geometric center of the device and designated and/or reference parts thereof. The words "up" and "down" will indicate directions relative to the horizontal and as depicted in the various figures. The words "clockwise" and "counterclockwise" will indicate rotation relative to a standard "right-handed" coordinate system. Such terminology will include the words above specifically mentioned, derivatives thereof and words of similar import.

Figure 1:
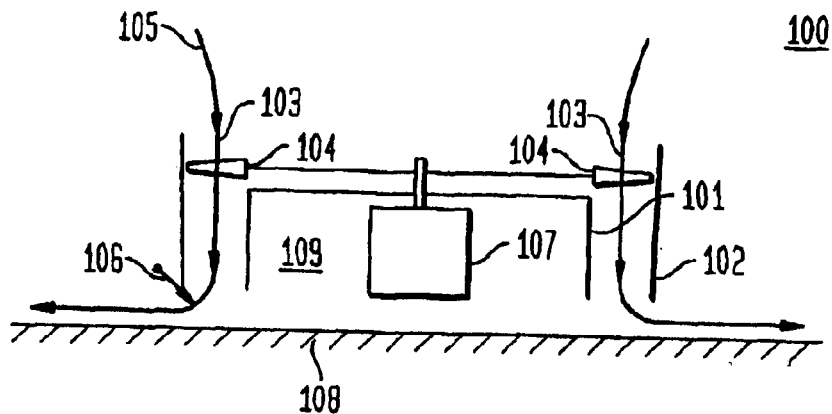
FIG. 1 depicts a cross-section of inventor's prior disclosed lifting platform.

FIG. 1 shows an embodiment of the inventor's prior disclosed lifting platform 100. A fan, comprising motor 107 and fan blades 104, generates an airflow 103 between inner shroud 101 and outer shroud 102. The airflow 103 is turned outward by the ground 108 and a pressure difference between the outer air and the inner space 109 is established. This is determined by $\varrho V^2/R$, where $\varrho$ is the air density, V is the airspeed (represented by vector 105) and R is the radius of curvature 106 as air leaves the region between inner shroud 101 and outer shroud 102, and is tuned horizontal by the ground 108.

Figure 2:
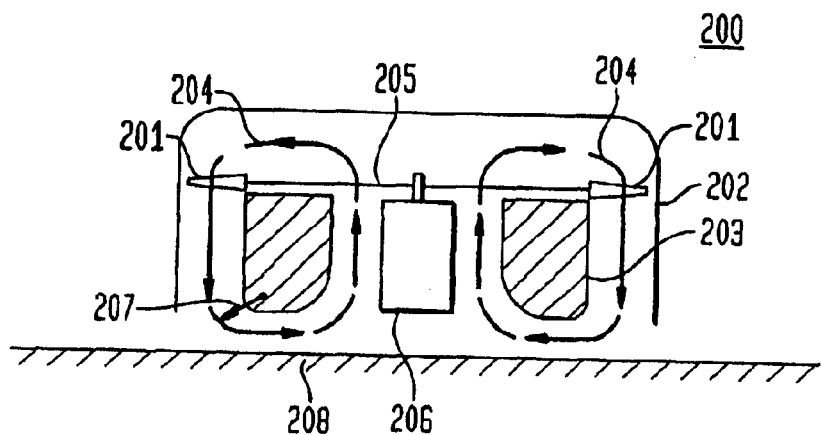
FIG. 2 depicts a first embodiment of a toroidal vortex attractor.

FIG. 2 shows how a lifting platform of the type described in FIG. 1 can be modified into a toroidal vortex attractor 200 in accordance with the present invention. Outer shroud 202 surrounds the device and forms a sealed container. The inner shroud 203 is thickened into a torus-like shape. The fan blade support 205 can be made into a spider form to allow air to freely pass through it. Air is blown down through the fan blades 201 as before. The fan assembly comprises a motor 206, fan blades 201 and fan blade support 205. However, in this system, because the top is sealed, the air pressure in the center is reduced, and air moving downwards at the bottom of the inner shroud 203 and outer shroud 202 is drawn inwards. The airflow is generally represented by arrows 204. When equilibrium is established, the difference in pressure between inside the device and the ambient outside is determined by $\varrho V^2/R$, where $\varrho$ is the air density, V is the airspeed and R is the radius of curvature 207 of the air as it turns from vertical to horizontal underneath the device as it collides with surface 208. The inertia of the moving air generates a fluidic seal that keeps the outside air from entering.

This system may be seen as a transformation of the cylindrical vortex attractor subject of prior patent applications of the present inventor. In this case, the plane of the vortex is vertical rather than horizontal. The present system has the advantage of a smaller value of R, i.e., the radius of curvature of the vortex. Thus, greater pressure drop can be sustained. In the prior vortex attractors, R is the radius of the outside of the impeller. With the present system, R is the minimum cross-section radius of an inner toroidal core. The minimum cross-section radius is a small fraction of the outer radius, and thus, the pressure difference is greater.

Furthermore, airflow direction 204 around the inner shroud 203 may be reversed while retaining the attractor functionality. It is irrelevant whether the air is ejected downward to be pulled horizontally or ejected horizontally to be pulled up vertically. The same pressure difference is established either way.

Figure 3:
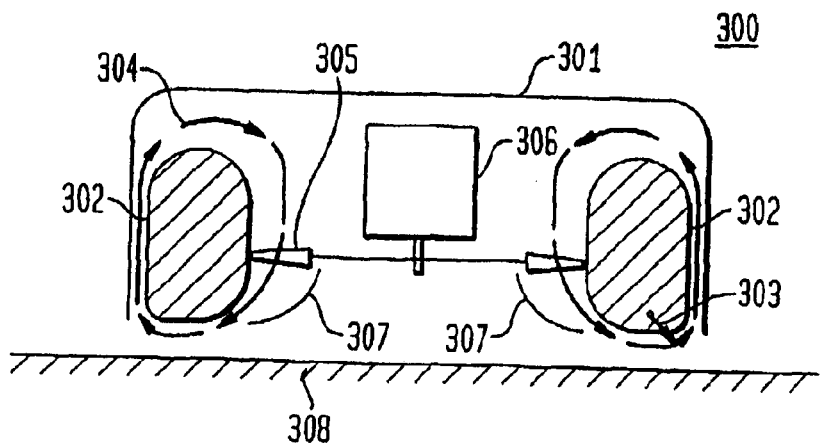
FIG. 3 depicts an improved embodiment of a toroidal vortex attractor.

However, this system is somewhat cumbersome, and may be simplified. FIG. 3 depicts an improved arrangement 300 of a toroidal vortex attractor. Again, an outer shroud 301 surrounds the device. A fan assembly comprising motor 306 and fan blades 305 is situated in the cental space and blows air downwards. Air guides 307 serve to direct the flow around the inner shroud 302 in the pattern illustrated by arrows 304. Thus, the toroidal vortex is established around the inner shroud 302. When equilibrium is established, the difference in pressure between inside the device and the ambient outside is determined by $\varrho V^2/R$, where $\varrho$ is the air density, V is the airspeed and R is the radius of curvature 307 of the air as it changes direction from horizontal under the inner shroud 302 to vertical to pass between the inner shroud 302 and the outer shroud 301.

Figure 4A:
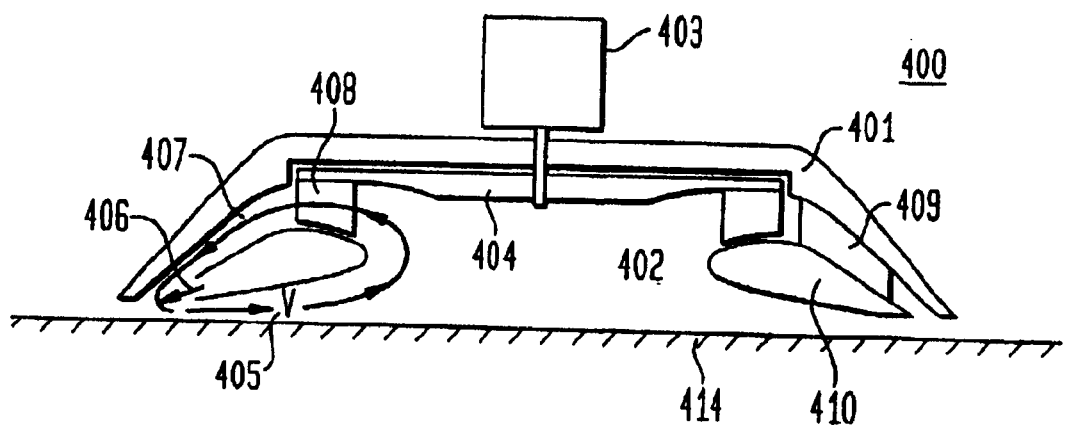
FIG. 4A depicts a side view of an alternate embodiment of a toroidal vortex attractor.
Figure 4B:
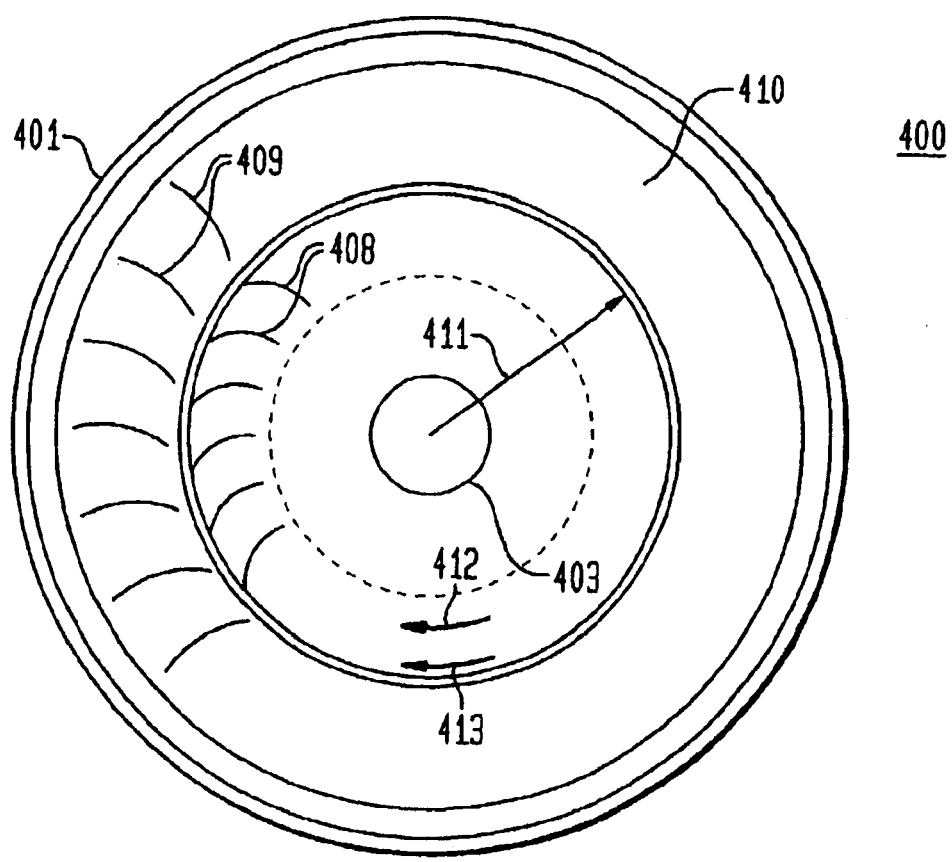
FIG. 4B depicts a top view of an alternate embodiment of a toroidal vortex attractor.

FIGS. 4A and 4B show the basic toroidal vortex attractor developed into a more practical design 400. In this design, the inner shroud 410 is flattened with the outer edge coming to a point. The outer shroud 401 follows this pattern. Thus, the airflow radius of curvature 406 is made very small. In particular, FIG. 4A depicts two areas of air flow, 407 and 402. The pressure difference between the outer zone 407 and inner zone 402 is supported by the toroidal vortex action of the circulating air 405, having a velocity v, and bound by the relationship (at equilibrium) $\varrho v^2/r$, where $\varrho$ is the air density, v is the airspeed and r is the radius of curvature 406 of the air as it turns from vertical to horizontal underneath the device. The smaller the value of r 406, the larger the pressure differential that can be supported. Referring particularly to FIG. 4B, the impeller blades 408 are seen to take the form of those commonly used in a vacuum cleaner. Air leaving the impeller blades 408 has its flow components straightened by a series a vanes 409 (visible in both perspectives) to ensure an axial direction around the inner shroud 410.

The maximum pressure difference between zones 407 and 402 (visible in FIG. 4A) is defined by the impeller blade tip radius 411 and impeller tip speed 413. For purposes of description, the impeller rotates in direction 412. This relationship is defined by (at equilibrium) $\varrho V^2/R$, where $\varrho$ is the air density, V is the impeller tip speed 413 and R is the radius of the impeller 411. It should be noted that the circulating air speed of airflow 405 (visible in FIG. 4A) is a great deal smaller that the impeller speed 413, so the radius of curvature 406 must be made small to enure that relationship. As the distance between the attractor 400 and the attracted surface 414 increases, the radius of curvature 406 also increases. Thus, at some critical distance, $\varrho v^2/r$ becomes the dominant factor. Thereafter, the attraction decreases with increasing distance from the attracted surface 414.

This system 400 is circular in plan form, but this is not essential. Nearly any plan form can be accommodated provided that a toroidal vortex can be established around the inner shroud 410. The present embodiment 400 utilized a conventional impeller type centrifugal pump, but this is not essential. Any form of air pump can be utilized that takes air in from zone 402 and pumps it out over the inner shroud 410.

Figure 5A:
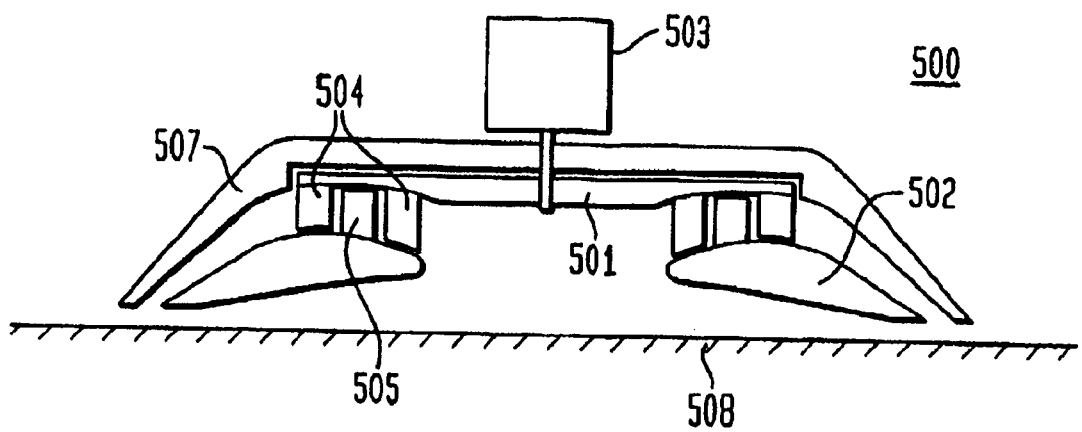
FIG. 5A depicts a side view of a toroidal vortex attractor with a two stage air pump.
Figure 5B:
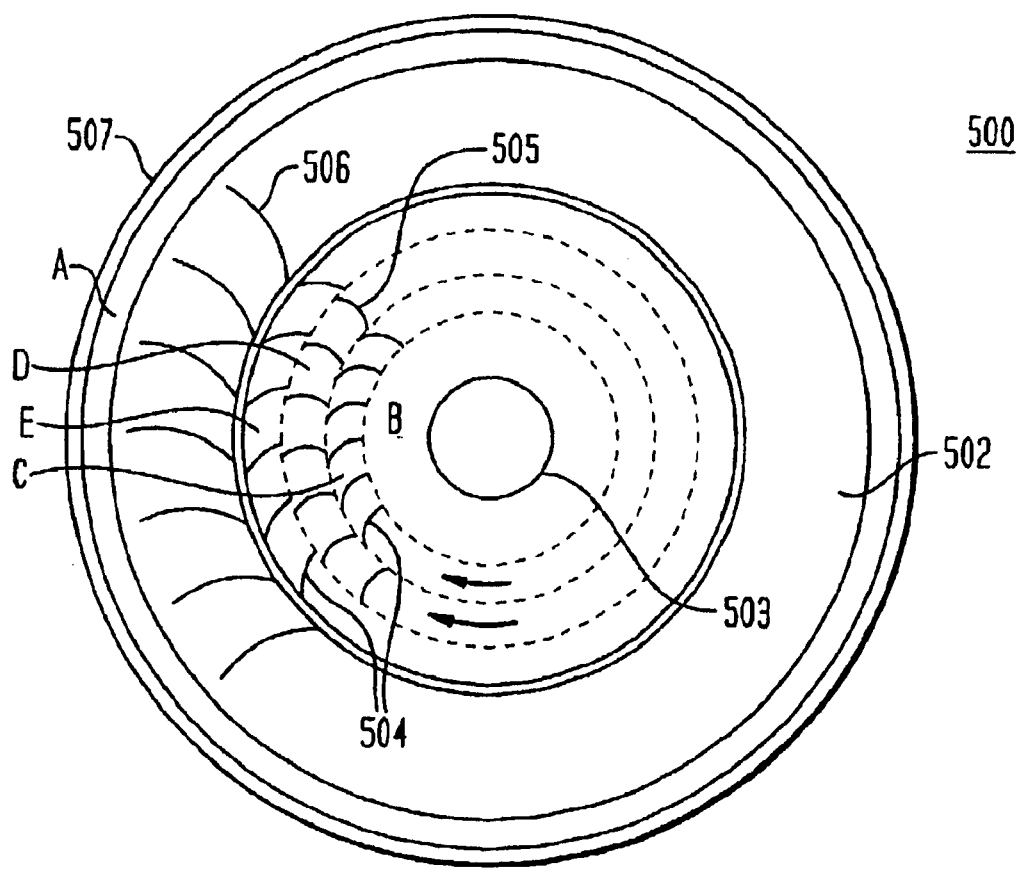
FIG. 5B depicts a top view of a toroidal vortex attractor with a two stage air pump.

FIGS. 5A and 5B illustrate a toroidal vortex attractor 500 utilizing a two stage centrifugal pump. The overall configuration is the same as in FIGS. 4A and 4B. The system 500 comprises a motor 503 coupled to an impeller backplate 501 which has two rings of rotor blades 504 attached thereto. The inner shroud 502 is the same form as before, with the exception that there are intervening stator blades 505 mounted on top. An outer shroud 507 encompasses the system 500.

Now referring particularly to FIG. 5B, beginning at the center, air at B enters the inner ring of rotor blades 504 and exits at C. The air at C is spinning with the motion imparted by the blades and is at a lower pressure than at B. The stator blades 505 remove the spinning air motion without changing the pressure so the pressure at D is substantially the same as that at C. The air now enters the outer set of rotor blades 504 and passes through to E. Air at E is at a lower pressure than that at C and D, and is once again spinning with the blade action. The outer row of stator blades 506 (not visible in FIG. 5A) takes the spin out of the motion without changing the pressure, and directs air around the inner donut 502. The air pressure at the end of these stator vanes 506 is essentially atmospheric.

This two stage centrifugal pump can support a greater pressure difference than the single stage pump of FIGS. 4A and 4B. This pressure has to be maintained by the toroidal vortex action of the air passing around the sharp outer edge of the inner shroud 502. Importantly, the radius of curvature must be kept small. This occurs when the gap between the attractor 500 and the surface 508 is small. The two stage pump system is very well suited to applications when the attractor 500 is in direct contact with the surface 508. In this application, the performance is far superior to that of a vacuum system because the toroidal vortex action of air flowing around the inner shroud prevents air from entering the central area and destroying the attraction.

As was the case with the system of FIGS. 4A and 4B, the attractor may have a variety of plan forms providing that the toroidal airflow around the inner shroud 503 is maintained.

Figure 6A:
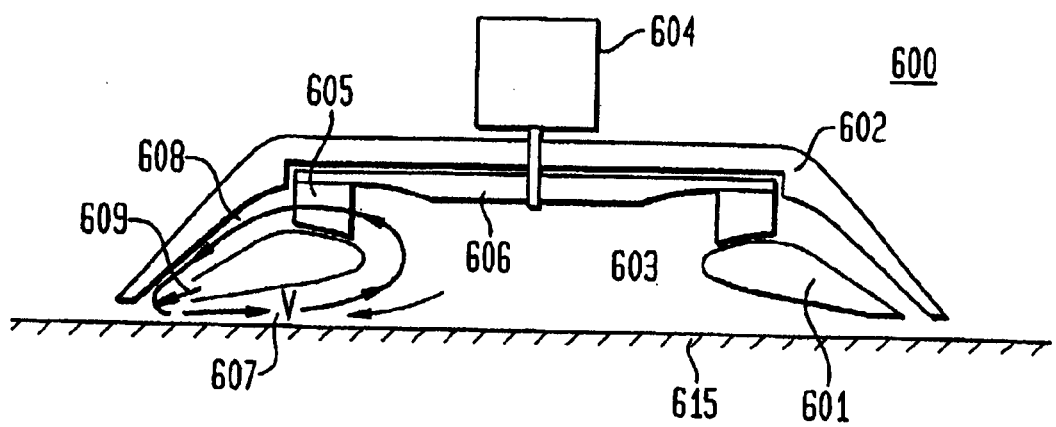
FIG. 6A depicts a side view of a compound vortex attractor.

The vortex attractor can generates a greater overall attraction by spinning the air around in the manner of a cylindrical vortex attractor, while retaining the beneficial toroidal vortex function. Paradoxically, the compound vortex attractor 600 illustrated in FIGS. 6A and 6B has fewer parts and is somewhat simpler that the toroidal vortex attractor. The reader might notice that this system 600 is the embodiment of FIG. 4, without the flow straightening vanes. The system comprises a motor 604 coupled to an impeller backplate 606 which has impeller blades 605 attached thereto. Again, the inner shroud 601 is flattened with the outer edge coming to a point. The outer shroud 602 follows this pattern. Thus, the airflow radius of curvature 609 is made very small. In particular, FIG. 6A depicts two areas of air flow, 603 and 608. The pressure difference between the outer zone 608 and inner zone 603 is supported by the toroidal vortex action of the circulating air 607, having a velocity v, and bound by the relationship (at equilibrium) v2/r, where is the air density, v is the airspeed and r is the radius of curvature 609 of the air as it turns from vertical to horizontal underneath the device. The smaller the value of r 609, the larger the pressure differential that can be supported.

There are two distinct airflow components. The first is the toroidal vortex, the vertical component 607 plainly seen in FIG. 6A. The second component 614, shown clearly in FIG. 6B, circulates parallel to the attracted surface 615. The speed is approximately that imparted by the impeller tip speed 612, and the radius-of curvature is the outer radius of the attractor 611.

In the previous embodiment, the pressure at the outer zone A is approximately atmospheric, however in the present embodiment 600, the pressure in the outer zone 608 is defined by the cylindrical vortex and is lower than atmospheric by an amount defined by $\varrho V^2/R2$, where V is the impeller tip speed 612 and R2 is the outer radius 611. The central pressure is established by the impeller tip speed and radius so that the pressure in the inner zone 603 is found to be atmospheric pressure $-\varrho V^2/R2 - \varrho V^2/R$ where R is the impeller radius 610.

The increase in pressure drop over the toroidal attractor, $\varrho V^2/R2$, is gained without any additional power consumption. The pressure difference between zone 608 and 603 has to be supported by the toroidal vortex, so as in the previous case $\varrho v^2/r$ must be greater than $\varrho V^2/R$, where v is the speed of flow 607 around inner shroud 601 and r is the radius of curvature 609.

As was the case of the toroidal vortex attractor, the compound attractor 600 can be fitted with a multi-stage pump.

Unlike the toroidal vortex attractor, however, the compound attractor 600 has an essentially circular shape in order to maintain the cylindrical vortex. Advantageously, it can be made flexible in order to follow the shape of curved surfaces. The toroidal vortex has been found to be, in general, more resistant to surface abnormalities.

The compound vortex attractor has been shown with a fixed outer shell and inner shroud, but a separate moving impeller. However, the attractor may be made in one piece along the lines of cylindrical vortex attractors previously described by the inventor. When made in such a fashion, it resembles a "bowl" impeller. FIGS. 7A and 7B shows such-an arrangement 700. Motor 702 is coupled to bowl shaped impeller 701. Attached to said impeller are vanes 703; as before, arranged concentrically. Inner shroud 704 is attached to the impeller 701 or by means of the impeller blades 703. FIG. 7B depicts a top view of the system 700, clearly illustrating the concentric array of vanes 703 and the presence of inner shroud 704. The impeller rotates in accordance with vector 705.

Figure 6B:
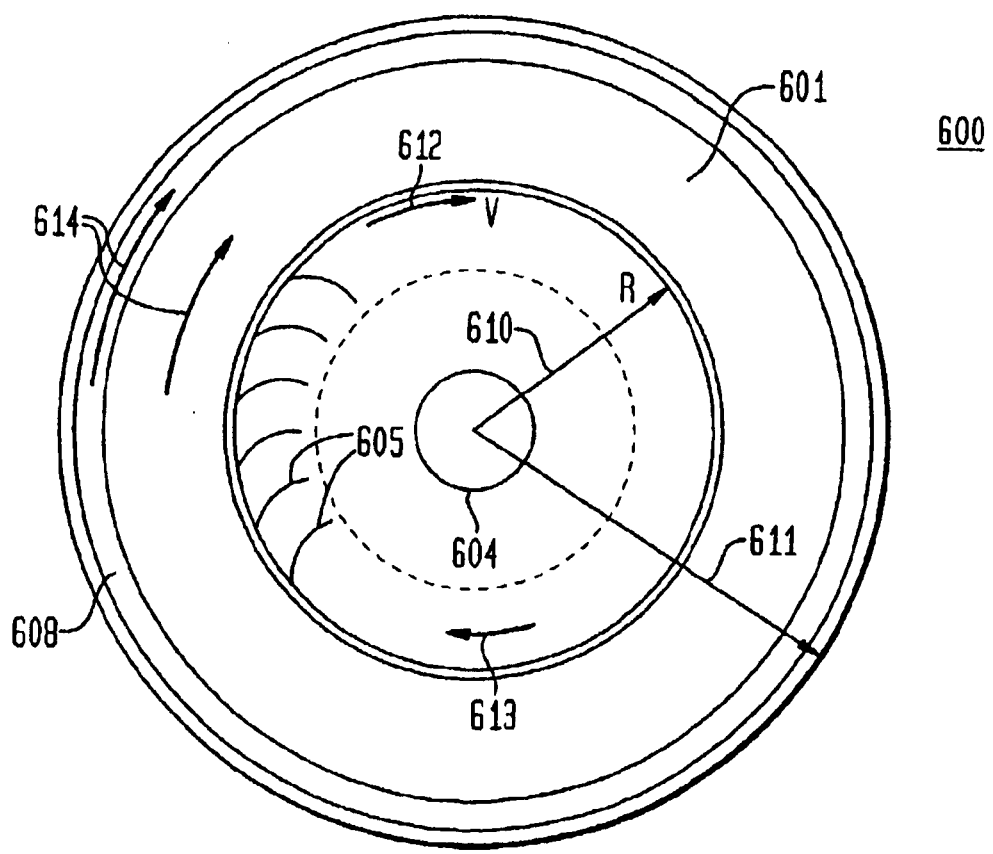
FIG. 6B depicts a top view of a compound vortex attractor.

Airflow for system 700 is exactly the same as the system 600 of FIGS. 6A and 6B, with the exception that the speed of the cylindrical vortex airflow component at 706 is higher. This is because of the surface friction of both the inner shroud 704 and the inside of the bowl shaped impeller 701. Combined, this leads to a slightly higher overall pressure drop.

Figure 8A:
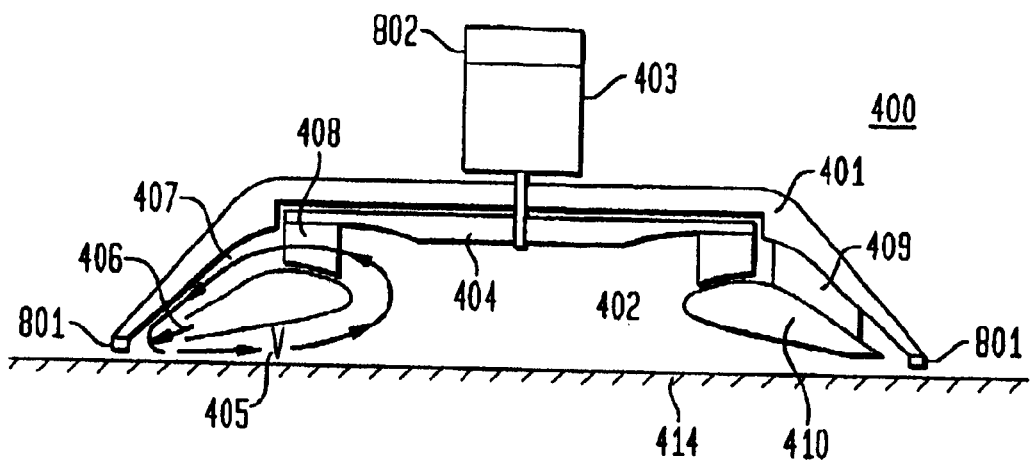
FIG. 8A depicts a side view of an alternate embodiment of a toroidal vortex attractor.
Figure 8B:
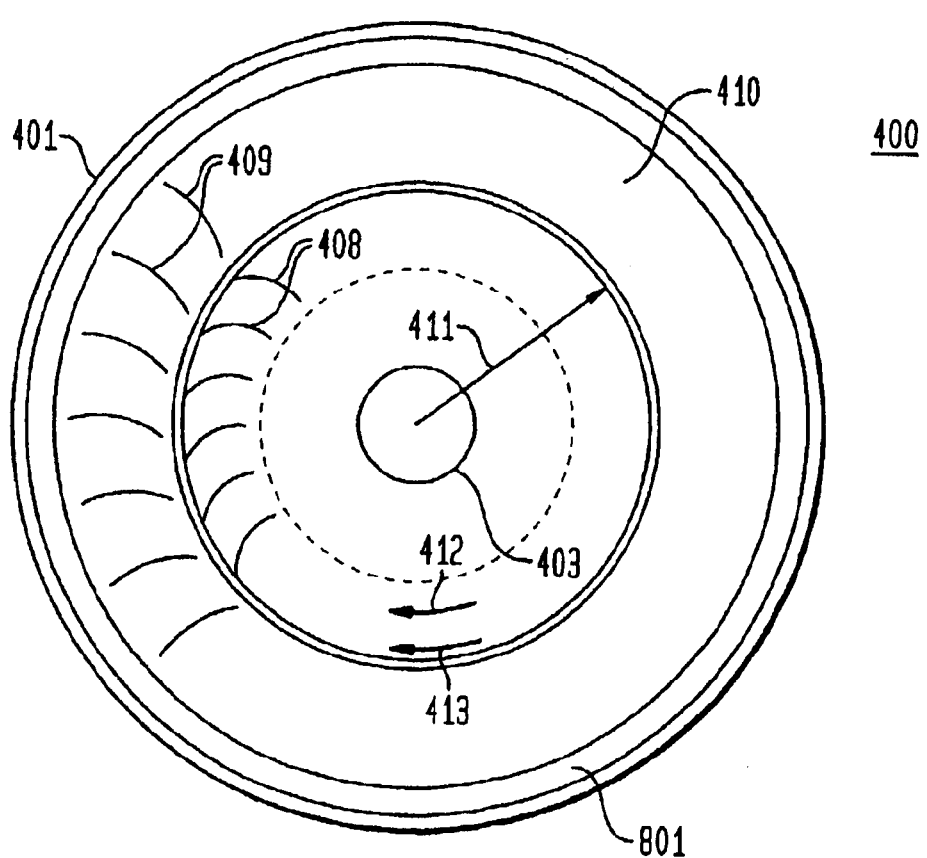
FIG. 8B depicts a top view of an alternate embodiment of a toroidal vortex attractor.

FIGS. 8A and 8B show the embodiment of FIGS. 4A and 4B, respectively. However, features are added for specific uses of toroidal vortex attractor 400. For example, seal means 801 is included to allow toroidal vortex attractor 400 to seal against a surface. This can allow toroidal vortex attractor 400 to maintain a stationary position relative to surface 414 and also prevent air from escaping into the atmosphere. Further, responsive control system 802 can be used to allow toroidal vortex attractor 400 to adjust to environmental changes. Responsive control system 802 may take measurements of a variety of environmental factors as well as factors internal to toroidal vortex attractor 400. Then, the speed at which impeller blades 408 rotate may be adjusted according to the measured environmental and/or internal factors.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

We claim:

1. An apparatus for generating a low pressure region, comprising:
    an outer shroud for encompassing said apparatus;
    fan means for generating a first air flow;
    flow straightening means aligned with said air flow to eliminate any rotational components thereof, thereby yielding a second air flow; and
    shroud means having an inner and outer perimeter in accordance with said outer shroud, further aligned concentrically with said fan means and said flow straightening means, such that said second air flow follows a circumferential path around said shroud means;
    wherein said second air flow, after following said path substantially becomes a toroidal vortex and thereby induces a low pressure region.

2. An apparatus according to claim 1 wherein said toroidal vortex forms a fluidic seal with a surface.

3. An apparatus according to claim 1 wherein said fan means are powered by a motor.

4. An apparatus according to claim 1 wherein said fan means are powered by a motor, said motor positioned between said fan means and an attracting surface.

5. An apparatus according to claim 1 wherein said fan means are powered by a motor, said motor positioned between said fan means and said outer shroud.

6. An apparatus according to claim 1 wherein said fan means comprises a multi-stage pump.

7. An apparatus according to claim 1 wherein said apparatus further comprises sealing means, said sealing means coupled to said toroidal vortex for preventing the escape of fluid from said vortex attraction means.

8. An apparatus according to claim 1 wherein said apparatus further comprises sealing means, said sealing means coupled to said toroidal vortex for preventing the escape of fluid from said vortex attraction means; said seal maintaining the position of said device against said surface.

9. An apparatus for generating a low pressure region for attracting itself toward a surface by providing a toroidal and cylindrical vortex comprising:
    an outer shroud for encompassing said apparatus;
    fan means for generating a fluid flow;
    shroud means having an inner and outer perimeter in accordance with said outer shroud, further aligned concentrically with said fan means such that said fluid flow follows a circumferential path around said shroud means;
    wherein said fluid flow, after following said path substantially generates a toroidal vortex which is supplemented by a cylindrical vortex whose flow is imparted by said fan means; further wherein said toroidal vortex and said cylindrical vortex induce a low pressure region.

10. An apparatus according to claim 9 wherein said fan means further comprise concentrically placed blades.

11. An apparatus according to claim 9 wherein said fan means comprise a plurality of sets of concentrically placed blades.

12. An apparatus according to claim 9 wherein said shroud means further comprises concentrically placed vanes.

13. An apparatus according to claim 9 wherein said fan means are powered by a motor.

14. An apparatus according to claim 9 wherein said fan means are powered by a motor, said motor positioned between said fan means and an attracting surface.

15. An apparatus according to claim 9 wherein said fan means are powered by a motor, said motor positioned outside of said low pressure region.

16. An apparatus according to claim 9 wherein said apparatus further comprises a responsive control system that senses environmental changes which effect the required speed of said fan means and accordingly adjusts the speed of said fan means.

17. An apparatus according to claim 9 wherein said fan means comprises a multi-stage pump.

18. An apparatus according to claim 9 wherein said apparatus further comprises sealing means for preventing the escape of said fluid from said apparatus.

19. An apparatus according to claim 9 wherein said apparatus further comprises sealing means for preventing the escape of said fluid from said apparatus, wherein the seal resulting therefrom maintains the position of said apparatus relative to said surface.

20. An apparatus for generating a low pressure region, comprising:
- an outer shroud for encompassing said apparatus;
- fan means for generating a first fluid flow;
- flow straightening means aligned with said fluid flow to eliminate any rotational components thereof, thereby yielding a second fluid flow; and
- shroud means having an inner and outer perimeter in accordance with said outer shroud, further aligned concentrically with said fan means and said flow straightening means, such that said second, fluid flow follows a circumferential path around said shroud means;
- wherein said second fluid flow, after following said path substantially becomes a toroidal vortex and thereby induces a low pressure region.

21. An apparatus according to claim 20 wherein said outer shroud forms a fluidic seal with an attracting surface.

22. An apparatus according to claim 20 wherein said fan means are powered by a motor.

23. An apparatus according to claim 20 wherein said fan means are powered by a motor, said motor positioned between said fan means and an attracting surface.

24. An apparatus according to claim 20 wherein said fan means are powered by a motor, said motor positioned between said fan means and said outer shroud.

25. An apparatus according to claim 20 wherein said fan means comprise a fan blade support of a spider form to allow passage of said fluid.

26. An apparatus according to claim 20 wherein said fan means comprises a multi-stage pump.

27. An apparatus according to claim 20 wherein said apparatus further comprises sealing means for preventing the escape of said fluid from said apparatus.

28. An apparatus according to claim 20 wherein said apparatus further comprises sealing means for preventing the escape of said fluid from said apparatus, wherein the seal resulting therefrom maintains the position of said apparatus relative to said surface.

29. An apparatus for generating a low pressure region capable of attracting a surface by providing a toroidal and cylindrical vortex comprising:
- an outer shroud for encompassing said apparatus;
- fan means for generating a fluid flow;
- shroud means having an inner and outer perimeter in accordance with said outer shroud, further aligned concentrically with said fan means such that said fluid flow follows a circumferential path around said shroud means;
- wherein said fluid flow, after following said path substantially generates a toroidal vortex which is supplemented by a cylindrical vortex whose flow is imparted by said fan means;
- further wherein said toroidal vortex and said cylindrical vortex induce a low pressure region.

30. An apparatus according to claim 29 wherein said fan means further comprise concentrically placed blades.

31. An apparatus according to claim 29 wherein said fan means comprise a plurality of sets of concentrically placed blades.

32. An apparatus according to claim 29 wherein said shroud means further comprises concentrically placed vanes.

33. An apparatus according to claim 29 wherein said fan means is powered by a motor.

34. An apparatus according to claim 29 wherein said fan means are powered by a motor, said motor positioned between said fan means and an attracting surface.

35. An apparatus according to claim 29 wherein said fan means are powered by a motor, said motor positioned outside of said low pressure region.

36. An apparatus according to claim 29 wherein said apparatus further comprises a responsive control system that senses environmental changes which effect the required speed of said fan means and accordingly adjusts the speed of said fan means.

37. An apparatus according to claim 29 wherein said fan means comprises a multi-stage pump.

38. An apparatus according to claim 29 wherein said apparatus further comprises sealing means for preventing the escape of said fluid from said apparatus.

39. An apparatus according to claim 29 wherein said apparatus further comprises sealing means for preventing the escape of said fluid from said apparatus, wherein the seal resulting therefrom maintains the position of said apparatus relative to said surface.

40. A method of generating a low pressure region, comprising the steps of:
- providing a fluid flow comprising a rotational component and a tangential component; and
- manipulating said tangential component to effect a toroidal vortex flow;
- wherein said manipulating is supplemented by a cylindrical vortex imparted by said rotational component, said toroidal vortex and said cylindrical vortex inducing a low pressure region, said low pressure region resulting in an attractive force toward a surface.

41. A method in accordance with claim 40 wherein said method further comprises the step of sealing, said sealing preventing the escape of said fluid.

42. A method in accordance with claim 40 wherein said method further comprises the step of sealing, said sealing preventing any translation along said surface.

* * * * *